United States Patent Office 3,330,618
Patented July 11, 1967

3,330,618
TREATMENT OF POLYMERIC MATERIALS
Frank Harry Burkitt, Sale, and James Harvey Butterworth, Hale, England, assignors to Tootal Broadhurst Lee Company Limited, Manchester, England
No Drawing. Filed Jan. 17, 1963, Ser. No. 252,054
Claims priority, application Great Britain, Jan. 19, 1962, 2,136/62; July 4, 1962, 25,571/62; Nov. 30, 1962, 45,305/62
17 Claims. (Cl. 8—116.2)

The present invention relates to the treatment of polymeric materials containing at least one reactive —OH or >NH or —SH group in each molecule of the material. The material may be, for example cellulosic material, such as paper, wood or cellulosic film; a cellulose derivative such as cellulose acetate; proteinaceous material such as wool or animal hides or skins; or polyvinyl alcohol. More particularly the invention concerns the treatment of cellulosic textile materials such as fibres, yarns or fabrics whether woven or knitted fabrics or non-woven fabrics such as, for example, bonded fibre fabrics of cellulose or cellulose derivatives.

In the specification of application No. 90621 there is described a process for treating such polymeric materials, in the presence of an alkaline or potentially alkaline catalyst, with a sulphonium salt which in the presence of the catalyst liberates the following sulphonium cation I with two free valencies:

(I) 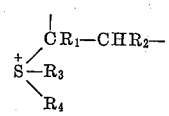

where $R_1$ and $R_2$ may be hydrogen or a lower alkyl group and may be the same or different, and $R_3$ and $R_4$ may be the group

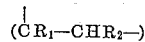

or an alkyl, substituted alkyl, alicyclic, aralkyl, aromatic or heterocyclic residue and may be the same or different. The lower alkyl group represented by $R_1$ or $R_2$ is preferably one containing 1 to 3 carbon atoms. There is also described in the above-mentioned specification the treatment of the polymeric materials with resin as well as with the sulphonium salt.

The product formed by the reaction between the polymeric material and the sulphonium salt is further described as having the general formula:

(II) 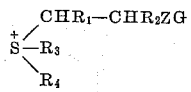

wherein G represents the residue of a polymeric chain, Z represents O, N or S and $R_1$, $R_2$, $R_3$ and $R_4$ have the meanings given above or $R_3$ and/or $R_4$ represent $$CHR_1—CHR_2ZG$$

We have now discovered that this reaction forms products of the following general formula:

(III) 

wherein X may be the group $(CR_1=CHR_2)$ or an alkyl, substituted alkyl, alicyclic, aralkyl, aromatic, or heterocyclic residue or $CHR_1—CHR_2ZG$.

$R_1$ and $R_2$ may be hydrogen or an alkyl group containing 1 to 3 carbon atoms and may be the same or different, Z may be oxygen, nitrogen and sulphur, and G is the residue of a polymeric chain.

We have found that products having the general Formula III prepared according to the process described in the aforementioned specification very readily pick up iron compounds and anionic dyestuffs, and this may be a serious disadvantage, particularly in the application of this process to the treatment of textile materials, especially cellulosic textile materials, which consequently become discoloured very easily. Although the tendency to pick up iron compounds is less marked when the polymeric materials have also been treated with resins as described in the aforementioned specification, it is still present to a serious extent. Further products prepared according to the process described in the aforementioned specification frequently have a smell especially when wet.

We have now found that if such polymeric materials are treated with alkalis or ring-forming compounds, as hereinafter defined, after treatment by the process described in the aforementioned specification then the tendency to pick up iron compounds and anionic dyestuffs and the tendency to smell when wet are very much reduced, and may even be eliminated, and yet this treatment does not substantially impair the properties of the treated materials, such as for example the increased dimensional stability and the improved smooth-drying properties of cellulosic fabrics which have been treated by the process so as to form cross-linked products.

By the expression "ring-forming compound" we mean a substance which is soluble in the treating solution and which is a sulphite, bisulphite, hydrosulphite or a salt of a substance of the general formula:

(IV)     ABC wherein A may be —OH, >NH or —SH, B is an alkylene group preferably having no more than two carbon atoms, and C is the residue of an acid for example —$PO_4H_2$ and preferably —COOH or —$SO_3H$.

According to the present invention, therefore, the product formed by the reaction, in the presence of an alkaline or potentially alkaline catalyst, between a polymeric material containing at least one reactive —OH or >NH or —SH group in each molecule of the material and a sulphonium salt which liberates the cation I, is treated with alkali or a ring-forming compound as hereinbefore defined, preferably in aqueous solution.

Suitable alkalis are, for example, caustic soda, caustic potash, sodium carbonate or sodium bicarbonate.

Suitable ring-forming compounds are, for example, sodium or potassium sulphite sodium bisulphite or salts of any of the following acids, namely, thioglycollic acid, α- or β-mercapto propionic acid, thiomalic acid or β-mercapto ethyl sulphonic acid.

The present invention includes products which may be represented by the following general formula:

(V) 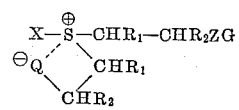

where Q is a residue of an anion of a ring-forming compound as hereinbefore defined and X, $R_1$, $R_2$, Z and G have the meanings given above.

The invention especially includes such products in which $R_1$ and $R_2$ represent H, Z represents O, G represents the residue of a cellulosic chain and X represents $$CHR_1CHR_2ZG$$

Where the ring-forming compound used is a sulphite then Q represents $SO_2$—$O^\ominus$, and where it is a thioglycollate then the product would be of the formula:

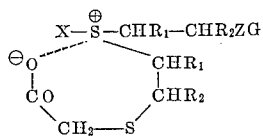

When using a ring-forming compound according to the present invention we prefer to use an aqueous solution of an alkaline sulphite, or of an alkaline salt of a substance of the general Formula IV to which has been added alkali. Substances which liberate alkaline sulphites in the presence of alkali may be used, for example, sodium bisulphite or the formaldehyde-bisulphite addition product.

The process of this invention can be carried out at ambient temperature or at a higher temperature and even at the boil. If a hot treating solution not containing sulphite is used then the higher the alkalinity the greater the reduction in the tendency to pickup iron compounds and anionic dyestuffs. On the other hand if a hot treating solution containing sulphite is used then the reduction in the tendency to pick up iron compounds and anionic dyestuffs is greatest if the pH is between 10.5 and 12.5 when measured at room temperature. It is, however, important that the treatment or reaction with alkali and/or ring-forming compound should not be so drastic or carried out for such a time that the properties of the treated materials characteristic of cross-linked products are substantially reduced or destroyed. For example some improvement is obtained if sodium sulphite is used at pH 8, or a mixture of sodium hydroxide and sodium sulphite at pH 13 but better results are obtained using a mixture of sodium carbonate and sodium sulphite at pH 11 (such pH measurements being made at room temperature but the treatments being carried out with the solutions at a high temperature or even at the boil). If salts of compounds of the general formula ABC are used instead of sodium sulphite, then a pH as high as 13 can be used (the pH being measured at room temperature but the treatment being carried out at a high temperature or even at the boil).

The process described in the aforementioned specification involves the treatment of the polymeric material with an alkaline or potentially alkaline catalyst and we prefer to carry out the process of the present invention as a continuous process which follows immediately on the process described in the aforementioned specification. It may be necessary therefore to remove the catalyst from the polymeric material, for example by washing or neutralisation, before it is treated with alkali and/or ring-forming compound if one wishes the treating solution to remain within the preferred limits of alkalinity.

We have further found that the best results are obtained from the process of the present invention if the conditions of the previous treatment with the sulphonium salt and alkaline or potentially alkaline catalyst are adjusted so that the time during which the polymeric material is in contact with this catalyst is as short as possible, consistent with the reaction between the sulphonium salt and the polymeric material being completed. For example when using 5% to 15% w./v. of caustic soda as the catalyst the treatment time should be of the order of 5 to 20 seconds at normal tempertaure.

The present invention further includes the treatment of polymeric material containing at least one reactive —OH or NH or —SH group in each molecule of the material with a sulphonium salt which liberates the cation I in the presence of an alkaline or potentially alkaline catalyst, and subsequently treating the product of such reaction with alkali and/or ring-forming compound, as hereinbefore defined, in aqueous solution, in which there is present in the alkaline treatment solution at either or both stages of the treatment, an agent which forms a stable water-soluble compound or complex with iron atoms. Examples of such agents are the tetra-sodium salt of ethylene diamine tetraacetic acid or the substance sold by Geigy Co. Ltd. under the trade name Sequestrene C.S. which may be present in the solution of alkaline or potential alkaline catalyst with which the polymeric material is treated after treatment with the sulphonium salt and/or may be present in the solution of alkali and/or ring-forming compound with which the product of the reaction between the polymeric material and the sulphonium salt is subsequently treated. The presence of such agent in the treatment solutions still further prevents contamination of the polymeric material with iron compounds which may be present in the treatment solution, for example from the machinery used in the treatment.

We have further found that any tendency of the polymeric material treated with sulphonium salt to smell when wet may be further reduced if it is treated with a detergent after treatment with alkali and/or ring-forming compound.

We may also treat the material with an oxidising agent, for example a mild oxidising agent such as a perborate or a peroxide, or a strong oxidising agent such as, for example sodium hypochloride, after treatment with the alkali and/or ring-forming compound. An oxidising agent may also be incorporated in the washing or neutralising bath used for treating the polymeric material after it has been treated with sulphonium salt in the presence of an alkaline or potentially alkaline catalyst and before it is treated with alkali and/or ring-forming compound according to the present invention. The treatment with an oxidising agent, especially when this follows the treatment with alkali or potential alkali reduces the tendency of the treated material to pick up chlorine when it is subsequently washed with chlorine-containing bleaching agents during laundering, as compared with the material before treatment with the oxidising agent.

We have further found that those dyestuffs and textile assistants which have a —SH, —OH or >NH group react chemically with the vinyl group or groups of polymeric materials which have been treated by the process described in the aforementioned specification and subsequently treated with alkali and/or ring-forming compound. Such dyestuffs and textile assistants are hereinafter called vinyl reactive dyestuffs and vinyl reactive assistants respectively.

The present invention includes, therefore, treating the product formed by the reaction in the presence of an alkaline or potentially alkaline catalyst, between a polymeric material containing at least one reactive —OH or >NH or —SH group in each molecule of the material and a sulphonium salt which liberates the cation I, with alkali and/or ring-forming compound, as hereinbefore defined, preferably in aqueous solution, and simultaneously with the treatment with alkali and/or ring-forming compound or prior thereto treating such product with a vinyl reactive dyestuff or vinyl reactive assistant.

Vinyl reactive assistants may be softening agents, for example lauryl mercaptan, or softening agents and waterproofing agents, for example stearyl alcohol or long chain amines. A suitable vinyl reactive dyestuff is, for example, the dyestuff

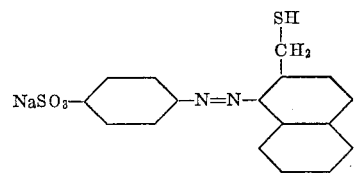

The invention will be more clearly understood by reference to the following examples which are purely illustrative.

*Example 1*

A length of woven cotton, 80's square, fabric was padded through an aqueous 23% w./v. solution of the disodium salt of tris-(β-sulphatoethyl) sulphonium inner salt, passed through a mangle adjusted so that the fabric retained 50% of its own weight of solution and dried. The dried fabric was then run through a 10% w./v. solution of sodium hydroxide, the time of contact between the fabric and the solution being about five seconds. The fabric was washed well with water, then with dilute acetic acid and finally with water and dried.

At the end of this first stage of treatment the fabric had much improved properties of resisting creasing when wet and drying smooth as compared with the untreated fabric, but it had a smell when wet. In addition, the fabric also retained iron compounds and anionic dyestuffs when washed in water containing even very small quantities of these materials.

Different portions of this fabric were further treated in the following different aqueous solutions:

(a) 0.5% w./v. sodium hydroxide +1% w./v. anhydrous sodium sulphite for 5 minutes at 90–95° C.

(b) 1.0% w./v. sodium hydroxide +1% w./v. anhydrous sodium hydrosulphite for 4 minutes at 95–100° C.

(c) 1% w./v. anhydrous sodium carbonate +1% anhydrous potassium sulphite for 5 minutes at 95–100° C.

(d) 0.5% w./v. sodium hydroxide +1% sodium formaldehyde bisulphite for 5 minutes at 95–100° C.

(e) 2% w./v. anhydrous sodium sulphite +1% anhydrous sodium carbonate for 30 minutes at 60° C.

(f) 2% w./v. anhydrous sodium sulphite for 15 minutes at 95–100° C.

(g) 1% anhydrous sodium thioglycollate +1% anhydrous sodium carbonate for 1 minute at 100° C.

(h) ½% anhydrous sodium thioglycollate +1% sodium hydroxide for 30 seconds at 100° C.

Each of the different portions of fabric was then washed well with water. In each case, the properties of resisting creasing when wet and drying smooth of the fabric were substantially unaltered by the treatment, but the smell when wet and the tendency to pick up anionic dyestuffs and iron compounds had been very much reduced.

The above portions of fabric were further washed with an aqueous solution containing 1 gram per litre of a detergent, Lissapol N sold by Imperial Chemical Industries Limited for 30 seconds at 70° C. ("Lissapol" is a Registered Trademark). This further washing treatment was found to reduce still further any tendency of the fabric to smell when wet.

The thoroughness of the treatment described, in the above and later examples, can be conveniently tested by dyeing a sample of the treated fabric in a solution of Lissamine Fast Red 4 B containing 1% by weight of the dyestuff on the weight of the fabric for 15 minutes at room temperature and then rinsing in warm water and drying, and comparing the treated and dyed sample with a sample of the fabric at the end of the first stage of treatment which has also been dyed. In the above example the former sample dyed very much less deeply than a sample at the end of the first stage of treatment.

*Example 2*

A 100 yard length of white woven cotton poplin fabric was passed through an aqueous solution containing 20% w./v. disodium salt of tris-(β-sulphatoethyl) sulphonium inner salt, 5% w./v. of the substance sold under the trade name Fixapret PH (50% solution of a cyclic propylene urea/formaldehyde resin precondensate), 1% w./v. zinc chloride, and the excess solution was squeezed off by passing the fabric between the bowls of a mangle adjusted so that the fabric retained about 50% of its own weight of liquor. The fabric was dried and then baked for three minutes at 150° C.

The fabric was then run as a continuous process between the bowls of a mangle the lower bowl of which was partially immersed in a 10% w./v. solution of sodium hydroxide and then through a series of washing tanks containing respectively (1) Water at room temperature
(2) ½% sodium carbonate+2% anhydrous sodium sulphite at 90–95° C.+0.1% Sequestrene C.S.
(3) As 2.
(4) As 2.
(5) ½% sodium carbonate solution at 90–95° C. +0.1% Sequestrene C.S.
(6) 0.5% anhydrous sodium carbonate+a solution of sodium hypochlorite containing 0.8 gm./litre of available chlorine+0.1% Sequestrene C.S.
(7) Hot water.
(8) Cold water.

The time of contact between the fabric and the liquor in each tank was 10 seconds.

The fabric was finally dried and found to have substantially no smell when wet and substantially no tendency to pick up iron compounds or anionic dyestuffs. A sample of the fabric removed before treatment with sodium sulphite had a smell when wet and picked up iron compounds and anionic dyestuffs. Both this sample and the finished fabric had similar properties of resisting creasing when wet and drying smooth, and in both these properties were much improved as compared with the untreated fabric. The tendency of the finished fabric to pick up chlorine was less than the fabric before it was treated in tank 6.

*Example 3*

A 100 yard length of white woven cotton poplin fabric was treated as described in the first paragraph of Example 2.

The fabric was then run as a continuous process through a 5% w./v. solution of sodium hydroxide and then through a series of washing tanks containing respectively (1) Water at room temperature
(2) 1.0% w./v. sodium thioglycollate+sufficient sodium hydroxide to give pH of 13.0. The temperature of this bath was maintained at 90–95° C.
(3) Hot water at 60–70° C.
(4) Cold water.
(5) 0.5% anhydrous sodium carbonate+a solution of sodium hypochlorite containing 1.5 gm./litre of available chlorine at room temperature. The pH of this solution was about 10.5.
(6) Cold water.
(7) Cold water.

The time of contact between fabric and liquor in each tank was about 50 seconds.

The fabric was finally dried and found to have substantially no smell when and substantially no tendency to pick up iron compounds or anionic dyestuffs.

A sample of the fabric removed before treatment in tank 2 had a smell when wet and picked up iron compounds and anionic dyestuffs. Both this sample and the finished fabric had similar properties of resisting creasing when wet and drying smooth, and in both samples these properties were much improved as compared with the untreated fabric. The tendency of the finished fabric to pick up chlorine was less than the fabric before it was treated in tank 6.

*Example 4*

A cotton poplin fabric as in Example 2 was treated as in Example 2 but 5% w./v. Fixapret CP (50% solution of a glycol urein/formaldehyde resin precondensate) was used instead of Fixapret PH. Also tank No. 6 contained 0.5% anhydrous sodium carbonate and 0.5% soap and 1% sodium perborate and 0.1% Sequestrene C.S. instead of sodium carbonate and sodium hypochlorite.

The finished fabric had substantially no smell when wet and substantially no tendency to pick up iron compounds or anionic dyestuffs, but it had a slightly greater tendency to pick up chlorine than the fabric treated by the process of Example 2.

Example 5

A length of woven cotton poplin fabric was padded through an aqueous 23% w./v. solution of the disodium salt of tris-(β-sulphatoethyl) sulphonium inner salt, passed through a mangle adjusted so that the fabric retained 50% of its own weight of liquor and dried. The dried fabric was then run through a 10% w./v. solution of sodium hydroxide, the time of contact between the fabric and the liquor being about five seconds. The fabric was washed well with water, dilute acetic acid and water and was finally dried.

At this stage the fabric had much improved properties of resisting creasing when wet and drying smooth as compared with the untreated fabric, but it had a smell when wet. In addition, the fabric also retained iron compounds and anionic dyestuffs when washed in water containing even very small quantities of these materials.

A portion of the fabric was immersed in a 2% w./v. solution of sodium bicarbonate and passed through the bowls of a mangle adjusted so that the fabric retained 50% of its own dry weight of liquor. It was then dried, baked for 3 minutes at 140° C. and thoroughly washed in water.

The properties of resisting creasing when wet, and drying smooth of the resulting fabric were substantially unaltered by the treatment but the smell when wet and the tendency to pick up anionic dyestuffs and iron compounds had been substantially reduced.

Example 6

A length of woven cotton poplin fabric was padded through an aqueous 23% w./v. solution of the disodium salt of tris-(β-sulphatoethyl) sulphonium inner salt, passed through a mangle adjusted so that the fabric retained 50% of its own weight of liquor and dried. The dried fabric was then run through a 10% w./v. solution of sodium hydroxide, the time of contact between the fabric and the liquor being about five seconds. The fabric was washed well with water, dilute acetic acid and water and was finally dried.

At this stage the fabric had much improved properties of resisting creasing when wet and drying smooth as compared with the untreated fabric, but it had a smell when wet. In addition, the fabric also retained iron compounds and anionic dyestuffs when washed in water comprising even very small quantities of these materials.

A portion of the fabric was immersed in 3% sodium hydroxide solution and passed through the bowls of a mangle adjusted so that the fabric retained about 60% of its own dry weight of liquor. The fabric sample was then passed through a chamber full of steam at about 105° C. The time of contact between the steam and the fabric was about three minutes.

The fabric was then well-washed in dilute acetic acid, and then in water and finally dried. On examination it was found that the smell when wet and the tendency to pick up iron compounds or anionic dyestuffs had been substantially reduced, and its ability to recover from wet creasing was only slightly reduced as compared with the unsteamed material.

Example 7

A sample of viscose rayon fabric treated as described in the first paragraph of Example 2 was then immersed in a 5% w./v. solution of sodium hydroxide for 20 seconds, washed in cold water for 20 seconds, and immersed in a 5% w./v. solution of lauryl mercaptan in methanol for 20 seconds. The fabric was then transferred to a boiling solution containing 1% of sodium carbonate and 1% of sodium sulphite and boiled for two minutes. Another sample was treated similarly except that the lauryl mercaptan was omitted.

Both samples were then boiled in methanol to remove unreacted residues, and dried.

The sample which had been treated with the lauryl mercaptan had pronounced water-repellent properties as compared with the blank. These water-repellent properties were fast to dry cleaning and prolonged washing. Both samples had improved properties of resisting creasing when wet and drying smooth as compared with the fabric before treatment. They had much reduced smell when wet and much reduced tendency to pick up iron compound and anionic dyestuffs as compared with cuttings removed from the samples before the treatment with sodium sulphite.

Example 8

A length of woven cotton fabric was treated as described in the first paragraph of Example 2.

The fabric was then run as a continuous process between the bowls of a mangle the lower bowl of which was partially immersed in a 10% w./v. solution of sodium hydroxide and then into a 2% w./v. solution of sodium bisulphite at room temperature. The time between the fabric leaving the mangle and entering the bisulphite solution was about 8 seconds and the fabric remained in the bisulphite solution for 30 seconds. The fabric was then washed well with cold water and dried.

The treated fabric was found to have substantially no smell when wet and no tendency to pick up iron compounds or anionic dyestuffs. The smooth-drying and crease-resisting properties of the fabric were also very good.

Example 9

A length of woven cotton 80's square fabric was padded through an aqueous solution containing 8% w./v. of the disodium salt of ethyl bis-(β-sulphatoethyl) sulphonium sulphate and dried. The sample was then soaked in a 10% w./v. solution of sodium hydroxide for 15 seconds, washed with water for 20 seconds and finally boiled in a solution containing ½% w./v. sodium carbonate and 1% w./v. sodium sulphite for 60 seconds. After rinsing with warm water and drying, the sample was found to have improved smooth drying properties as compared with the untreated fabric and no affinity for anionic dyestuffs.

We claim:

1. In a process wherein a material selected from the group consisting of cellulosic and proteinaceous materials and polyvinyl alcohol is treated in the presence of an alkaline catalyst with an agent selected from the group consisting of di- and tri-β-haloalkyl sulphonium salts and the sulphate and phosphate esters of bis- and tris-β-hydroxyalkyl sulphonium salts wherein the alkyl is selected from the group consisting of ethyl and isopropyl, the improvement which comprises subjecting the thus treated material to an aftertreatment with at least one compound selected from the group consisting of alkali sulphites, bisulphites, hydrosulphites and the alkali metal salts of compounds having the formula ABC where A is selected from the group consisting of —OH, >NH and —SH, B is alkylene and C is an acid radical selected from the group consisting of —COOH and —SO$_3$H.

2. The process of claim 1 wherein the compound used has the formula ABC where A is —SH, B is —CH$_2$— and C is —COOH.

3. The process of claim 1 wherein the treatment with said compound is carried out at from ambient temperature to 100° C., for a time varying from about 0.5 to 30 minutes.

4. The process of claim 1 wherein said material is cotton.

5. The process of claim 1 wherein said material is viscose rayon.

6. The process of claim 1 wherein (1) said material is a cellulosic textile; (2) said agent is the sulphate ester of tri-(β-hydroxyethyl) sulphonium sodium salt; (3) said after-treatment comprises applying an aqueous solution of an alkali metal sulphite; and (4) the after-treatment is followed by treatment with sodium hypochlorite.

7. The process of claim 6 wherein the material is also treated with a vinyl reactive compound selected from the group consisting of vinyl reactive dyestuffs and textile assistants.

8. The process of claim 1 wherein the after-treatment comprises treating said material with an aqueous solution of said compound.

9. The process of claim 8 wherein said material is a cellulosic textile.

10. The process of claim 9 wherein said agent is the disodium salt of tris-($\beta$-sulphatoethyl) sulphonium inner salt.

11. The process of claim 10 wherein said compound is sodium sulphite.

12. The process of claim 1 wherein the treatment with said compound is followed by a treatment with an oxidizing agent.

13. The process of claim 12 wherein the oxidizing agent is sodium hypochlorite.

14. A product having the formula:

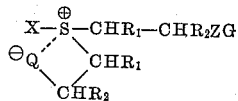

wherein X is selected from the group consisting of $CR_1=CHR_2$, $CHR_1-CHR_2ZG$, alkyl and aralkyl; $R_1$ and $R_2$ are selected from the group consisting of hydrogen and methyl provided that when $R_2$ is methyl, $R_1$ is hydrogen; Z is selected from the group consisting of oxygen, nitrogen and sulphur; G is the residue of a polymeric material selected from the group consisting of cellulosic and proteinaceous materials and polyvinyl alcohol; Q is an acid grouping having a negative charge and derived from a compound selected from the group consisting of alkali metal sulphites, bisulphites, hydrosulphites and salts of compounds having the formula ABC where A is selected from the group consisting of —OH, >NH, and —SH; B is alkylene and C is an acid radical selected from the group consisting of —COOH and —SO$_3$H.

15. Products as claimed in claim 14 in which $R_1$ and $R_2$ are hydrogen, Z is oxygen, G is the residue of a cellulosic chain and X is $CHR_1-CHR_2ZG$.

16. Products as claimed in claim 14 in which Q is —SO$_2$—O$^\ominus$.

17. Products as claimed in claim 14 in which Q is —S—CH$_2$—CO—O$^\ominus$.

References Cited

UNITED STATES PATENTS

| | | | |
|---|---|---|---|
| 2,215,196 | 9/1940 | Schlack | 8—84 |
| 3,046,075 | 7/1962 | Kantner | 8—1.2 |
| 3,073,662 | 1/1963 | Jaeger | 8—1.2 |
| 3,084,017 | 4/1963 | Reeves | 8—1.2 |
| 3,212,842 | 10/1965 | Burkitt | 8—120 |
| 3,251,642 | 5/1966 | Valentine et al. | 8—120 X |

OTHER REFERENCES

Stahman, J. of Org. Chem., Mar. 22, 1946, 8-Sulfone, pp. 719–735 (p. 730 is especially pertinent).

Chemical Abstracts, vol. 53, 1959, pp. 1759, 16,531, and vol. 54, 1960, pp. 5116 and 12,607.

Stein et al.: Journal of Organic Chemistry, vol. II, pp. 664–674 (1946).

Stahman et al.: Journal of Organic Chemistry, vol. II, pp. 704–718 (1946).

NORMAN G. TORCHIN, *Primary Examiner.*

A. H. WINKELSTEIN, *Examiner.*

D. LEVY, *Assistant Examiner.*